Feb. 11, 1936.    L. J. DE LANTY    2,030,101
MEANS FOR DETECTING FLAWS IN ELECTRICAL CONDUCTORS
Filed Nov. 10, 1933
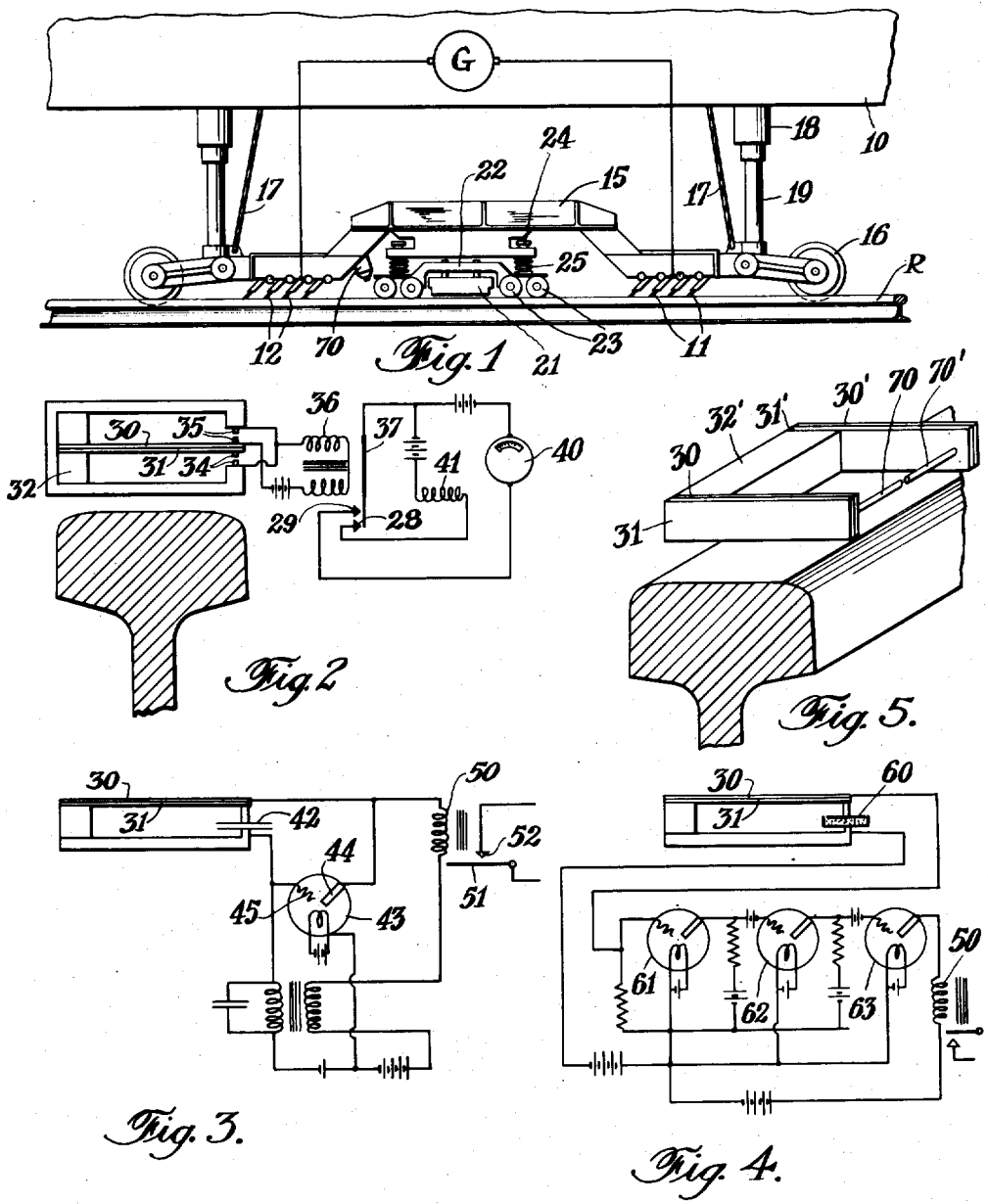
Inventor
LOREN J. DE LANTY
By Joseph H. Lipschutz
Attorney Patented Feb. 11, 1936

2,030,101

UNITED STATES PATENT OFFICE 2,030,101

MEANS FOR DETECTING FLAWS IN ELECTRICAL CONDUCTORS

Loren J. De Lanty, Spring Valley, N. Y., assignor to Sperry Products, Inc., Brooklyn, N. Y., a corporation of New York Application November 10, 1933, Serial No. 697,403

8 Claims. (Cl. 175—183)

This invention relates to means for detecting flaws in electrical conductors. In the well known type of Sperry flaw detector mechanism, current is sent through the conductor to establish an electromagnetic field surrounding the same, and variations in said field caused by the presence of flaws are detected by means of induction coils in which an E. M. F. is induced on entering the region of flaw.

It is the principal object of my invention to provide another apparatus for detecting flaws in electrical conductors which is not based upon the principle of inducing voltages. Instead, I cause the variations in flux in the region of a flaw to act upon magnetic and diamagnetic metals which lengthen and shorten when subjected to changes in the magnetic flux in which said metals are located.

Further objects and advantages of this invention will become apparent in the following detailed description.

In the accompanying drawing,

Fig. 1 is a side view of a portion of a rail flaw detector car to which my invention is shown applied.

Fig. 2 is an assembly view largely diagrammatic illustrating the principle of my invention.

Fig. 3 is a view similar to Fig. 2 but showing another responsive means for indicating the response of the detector member shown in Fig. 2.

Fig. 4 is a view similar to Figs. 2 and 3 and showing still another method for indicating the response of the detector member to changes in flux.

Fig. 5 is a perspective view showing a modified form of the detector member.

Referring to Fig. 1 of the drawing, I have shown my invention applied to the specific problem of detecting flaws in rails. I accomplish this by means of a car adapted to travel over the rails. A portion of the car body 10 is disclosed, and within said car body there is mounted a generator G for supplying current to sets of brushes 11, 12 adapted to engage the rail R to pass current therethrough. Said brushes are supported upon a current brush carriage 15 adapted to ride on the rail by means such as flanged wheels 16. The carriage 15 is normally held in raised or ineffective position by means such as retractile springs (not shown) and cables 17, and may be lowered against the action of said retractile springs mechanically by means of any suitable leverage system or by means of compressed fluid supplied to cylinders 18 to depress piston rods 19 connected to the carriage 15.

The current supplied to the rail by brushes 11 and 12 will establish an electromagnetic field surrounding the same and said field will be uniform except in the region of a flaw. For detecting such regions of flaw, I provide a detecting mechanism housed within a housing 21, supported on a detector carriage 22, adapted to ride on the rail by means such as rollers 23 and supported on the current brush carriage 15 for movement independent thereof by means such as loose-fitting bolts 24 and springs 25. The detector mechanism housed within housing 21 is designed to be responsive to variations in flux in the electromagnetic field so that as the car moves along, said detector mechanism will respond to any variations in flux caused by the presence of a defect in the conductor, in this case the rail R.

The detector mechanism which I here employ is a metallic rod. As is well known, magnetic materials, such as steel, will increase in length if the flux therethrough is increased and will decrease when the flux therethrough is decreased; while diamagnetic metals, such as nickel, will act oppositely, that is, they will shorten as the flux therethrough increases and lengthen as the flux decreases. By placing a strip of metal which is so affected by magnetic flux in the electromagnetic field created by passing current through the conductor by means of brushes 11, 12 and moving said metal along said conductor at a constant distance above the same, any region of flaw resulting in variation in flux intensity in the portion of the electromagnetic field traversed will cause the metal to lengthen or shorten as the case may be, and such lengthening and shortening may actuate suitable indicating means as described below.

Preferably, I employ a detector unit which, as shown in Fig. 2, may comprise two strips of metal fastened together, one of said strips 30 being of magnetic material, such as steel, which increases its length with increase of flux, while the other strip 31 may be of diamagnetic material, such as nickel, which shortens with increase in flux. The effect of such uniting of two oppositely acting strips is similar to that of a thermostatic element and will cause flexing of the strip. Thus, if the strip is fastened at one end to a fixed bracket 32 while the other end is free, the free end will have a multiplied movement in a manner well known in thermostats. I may utilize this multiplied movement to close one or the other of a set of contacts 34, 35 which will close the circuit through a relay 36, said circuit being of sufficient power to actuate an armature 37 to close the circuit at contact 29 through an indicator 40. In this manner, the slight movement of the detector strips 30, 31 can be caused to have a multiplied effect until said effect is sufficient to operate an indicator 40 which may be a recorder. The relay armature 37 may also engage a second contact 26 completing a circuit through a relay 41, suitable for causing a marking device such as a paint gun 70 to designate the region of origin of the impulse, that is, the region of the flaw. Contacts 34 and controls 35 are provided to utilize both increases and decreases in flux intensity in the path of travel; one pair alone being sufficient for utilizing flux change in one direction only.

In Fig. 3 I have shown a modified arrangement for obtaining an indication from the movement of the detector strip 30, 31. In this case, the free end of said strip, instead of closing contacts 34, 35 is caused to vary the capacity of a condenser 42 within an oscillatory circuit set up through the oscillator tube 43. It will be seen that the output from the plate 44 feeds back into the grid 45 and the grid circuit is controlled by the capacity 42. Said circuit may be such that it is normally just below oscillation, and flexing of the detector strip 30, 31 will vary the grid circuit 45 sufficiently to set said circuit into oscillation. The output of said oscillatory circuit may be caused to control a relay 50 to actuate an armature 51 to close the contact at 52 and thus energize any suitable indicator, recorder, or marker, or all three.

In Fig. 4 I have shown still another method of causing the detector strip 30, 31 to actuate an indicator. In this case, the free end of said strip may act upon a microphone button 60 which controls the input to the first tube 61 of an amplifying series comprising the additional amplifying tubes 62, 63, and the output from said amplifying system may energize the relay 50 in the same manner as in Fig. 3 to cause actuation of an indicator.

Since the detector strip 30, 31 comprising the two strips of different metal, constitutes in effect a thermostat, said strip will respond to temperature changes which may close the contacts of Fig. 2, or vary the capacity of Fig. 3, or vary the resistance of the microphone button of Fig. 4 and thus give an indication as of a flaw. Also, any variations in the current supplied by generator G will vary the flux in the electromagnetic field surrounding the conductor and this will cause actuation of detector strip 30, 31 to give an indication as of flaw. A similar false response would be obtained if the housing 21 moved toward and away from the conductor. To obviate all of the above objections, I may provide the construction shown in Fig. 5 wherein two similar strips 30, 31 and 30', 31' are mounted at opposite ends of a support 32', said strips being spaced along the axis of the conductor and along the direction of the current passing through the conductor, and each of said strips may carry at the free end thereof a member 70, 70', said members extending toward one another. Said members at their inner ends may carry either contacts such as contacts 34 or the plates of a condenser or the parts of a microphone 60. It will now be seen that temperature changes will affect both strips equally, similarly, and simultaneously, so that the relative positions of the adjacent ends of members 70 and 70' are not affected thereby. Similarly, if there is a surge of current constituting a variation from the normal supply, both strips will be affected equally, oppositely and simultaneously, so that the relative positions of the inner ends of members 70, 70' are not affected thereby. The same is true if the entire search unit comprising the two strips 30, 31 and 30', 31' is moved toward or away from the conductor.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaw detector mechanism for electrical conductors comprising an indicator and means for passing current through the conductor to establish an electromagnetic field surrounding the same, flaw responsive means for actuating said indicator, said flaw responsive means comprising metallic means whose size is responsive to the flux in said field, means for supporting said metallic means substantially in the plane of said field and means for moving said metallic means through said field in constant relation to said conductor.

2. In a flaw detector mechanism for electrical conductors comprising an indicator and means for passing current through the conductor to establish an electromagnetic field surrounding the same, flaw responsive means for actuating said indicator, said flaw responsive means comprising a metallic member whose size increases and decreases with increase and decrease of flux in said field, means for supporting said member substantially in the plane of said field and means for moving said member through said field in constant relation to said conductor.

3. In a flaw detector mechanism for electrical conductors comprising an indicator and means for passing current through the conductor to establish an electromagnetic field surrounding the same, flaw responsive means for actuating said indicator, said flaw responsive means comprising metallic means whose size is responsive to the flux in said field, means for supporting said metallic means substantially in the plane of said field, means for moving said metallic means through said field in constant relation to said conductor, a relay and means whereby said metallic means controls the circuit through said relay.

4. In a flaw detector mechanism for electrical conductors comprising an indicator and means for passing current through the conductor to establish an electromagnetic field surrounding the same, flaw responsive means for actuating said indicator, said flaw responsive means comprising metallic means whose size is responsive to the flux in said field, means for supporting said metallic means substantially in the plane of said field, means for moving said metallic means through said field in constant relation to said conductor, an oscillatory circuit and means whereby said metallic means controls said circuit.

5. In a flaw detector mechanism for electrical conductors comprising an indicator and means for passing current through the conductor to establish an electromagnetic field surrounding the same, flaw responsive means for actuating said indicator, said flaw responsive means comprising metallic means whose size is responsive to the flux in said field, means for supporting said metallic means substantially in the plane of said field means for moving said metallic means through said field in constant relation to said conductor, an oscillatory circuit, a variable condenser in said circuit for controlling the same, and means whereby said metallic means controls said condenser.

6. In a flaw detector mechanism for electrical conductors comprising an indicator and means for passing current through the conductor to establish an electromagnetic field surrounding the same, flaw responsive means for actuating said indicator, said flaw responsive means comprising metallic means whose size is responsive to the flux in said field, means for supporting said metallic means substantially in the plane of said field, means for moving said metallic means through said field in constant relation to said conductor, an amplifying circuit, a microphone for controlling the input of said circuit, and means whereby said metallic means controls said microphone.

7. In a flaw detector mechanism for electrical conductors comprising an indicator and means for passing current through the conductor to establish an electromagnetic field surrounding the same, flaw responsive means for actuating said indicator, said flaw responsive means comprising a pair of members fastened together to form a detector unit, one of said members being magnetic and the other diamagnetic, whereby their sizes will be changed oppositely in response to variations in flux in said field, means for supporting said members substantially in the plane of said field and means for moving said unit through said field in constant relation to said conductor.

8. In a flaw detector mechanism for electrical conductors comprising an indicator and means for passing current through the conductor to establish an electromagnetic field surrounding the same, flaw responsive means for actuating said indicator, said flaw responsive means comprising a pair of similar detector units, each unit comprising a pair of members fastened together,-one of said members being magnetic and the other diamagnetic whereby their sizes will be changed oppositely in response to variations in flux in said field, means for supporting said members substantially in the plane of said field and means for moving said units through said field in fixed relation to each other and in constant relation to said conductor.

LOREN J. DE LANTY.